US007201794B2

(12) United States Patent
Ito et al.

(10) Patent No.: US 7,201,794 B2
(45) Date of Patent: Apr. 10, 2007

(54) INK COMPOSITION

(75) Inventors: Hiroshi Ito, Nagano-Ken (JP); Kazuaki Watanabe, Nagano-Ken (JP); Tsuyoshi Sano, Nagano-Ken (JP); Bunji Ishimoto, Nagano-Ken (JP); Kiyohiko Takemoto, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 10/875,070

(22) Filed: Jun. 23, 2004

(65) Prior Publication Data

US 2005/0139124 A1    Jun. 30, 2005

Related U.S. Application Data

(63) Continuation of application No. 10/009,070, filed as application No. PCT/JP01/03127 on Apr. 11, 2001, now abandoned.

(30) Foreign Application Priority Data

Apr. 11, 2000   (JP)   ............................. 2000-109397

(51) Int. Cl.
    *C09D 11/02*   (2006.01)
(52) U.S. Cl. ............................... 106/31.86; 106/31.72; 106/31.75
(58) Field of Classification Search ............. 106/31.86, 106/31.72, 31.75
    See application file for complete search history.

(56) References Cited

U.S. PATENT DOCUMENTS

| | | | |
|---|---|---|---|
| 4,338,133 A | 7/1982 | Toyoda et al. | |
| 4,985,077 A | 1/1991 | Ise et al. | |
| 5,112,398 A | 5/1992 | Kruse | |
| 5,145,518 A | 9/1992 | Winnik et al. | |
| 5,221,334 A | 6/1993 | Ma et al. | |
| 5,272,201 A | 12/1993 | Ma et al. | |
| 5,364,461 A | 11/1994 | Beach et al. | |
| 5,519,085 A | 5/1996 | Ma et al. | |
| 5,560,770 A | 10/1996 | Yatake | |
| 5,707,433 A | 1/1998 | Ikemoto et al. | |
| 5,760,124 A | 6/1998 | Listigovers et al. | |
| 5,858,075 A | 1/1999 | Deardurff et al. | |
| 5,955,515 A | 9/1999 | Kimura et al. | |
| 5,981,623 A | 11/1999 | McCain et al. | |
| 6,004,389 A | 12/1999 | Yatake | |
| 6,034,153 A | 3/2000 | Tsang et al. | |
| 6,113,680 A | 9/2000 | Aoyama et al. | |
| 6,177,498 B1 | 1/2001 | Rehman | |
| 6,187,086 B1 | 2/2001 | Rehman | |
| 6,232,369 B1 | 5/2001 | Ma et al. | |
| 6,287,374 B1* | 9/2001 | Yanagida et al. | 106/31.9 |
| 6,372,818 B1 | 4/2002 | Kimura et al. | |
| 6,379,441 B1 | 4/2002 | Kanaya et al. | |
| 6,399,674 B1 | 6/2002 | Kashiwazaki et al. | |
| 6,433,039 B1 | 8/2002 | Schwarz | |
| 6,500,248 B1 | 12/2002 | Hayaski | |
| 6,511,170 B1 | 1/2003 | Gallo et al. | |
| 6,596,068 B1* | 7/2003 | Ito et al. | 106/31.6 |
| 6,648,951 B2* | 11/2003 | Chen et al. | 106/31.47 |
| 2002/0077384 A1 | 6/2002 | Sano et al. | |
| 2002/0078858 A1 | 6/2002 | Chen et al. | |
| 2002/0112643 A1 | 8/2002 | Tyvoll et al. | |

FOREIGN PATENT DOCUMENTS

| | | |
|---|---|---|
| EP | 1041127 | 10/1991 |
| EP | 0 761 783 | 3/1997 |
| EP | 0761783 | 3/1997 |
| EP | 0 879 858 | 11/1998 |
| EP | 0879858 | 11/1998 |
| JP | 5755975 | 4/1982 |
| JP | 62127373 | 9/1987 |
| JP | 01138277 | 5/1989 |
| JP | 0214260 | 1/1990 |
| JP | 02138374 | 5/1990 |
| JP | 07157698 | 6/1995 |
| JP | 8-60050 | 3/1996 |
| JP | 08283631 | 10/1996 |
| JP | 10 095941 | 4/1998 |
| JP | 10095941 | 4/1998 |
| JP | 10-298476 | 11/1998 |
| JP | 11-5933 | 1/1999 |
| JP | 11-43632 | 2/1999 |
| JP | 11-61012 | 3/1999 |

(Continued)

OTHER PUBLICATIONS

English Translation of Patent Abstract of WO 01/48101A1 dated Jul. 5, 2001.

(Continued)

*Primary Examiner*—J. A. Lorengo
*Assistant Examiner*—Veronica Faison-Gee
(74) *Attorney, Agent, or Firm*—Ladas and Parry LLP

(57) ABSTRACT

An object of the present invention is to provide an ink compositions which, when used with an ink jet recording apparatus, can realize excellent ink ejection stability while maintaining safety and satisfactory penetration of ink. The ink composition according to the present invention comprises at least a colorant, a humectant, a glycol monoether as a penetrating agent, a 1,2-alkanediol, and water, the weight ratio of the glycol monoether to the 1,2-alkanediol being in the range of 1:5 to 5:1. According to another aspect of the present invention, there is provided an ink composition comprising at least a pigment, a dispersant for dispersing the pigment, a 1,2-alkanediol, and water as a main solvent, the content of the 1,2-alkanediol being 0.5 to 10% by weight based on the total amount of the ink composition.

12 Claims, No Drawings

FOREIGN PATENT DOCUMENTS

| | | |
|---|---|---|
| JP | 11-246803 | 9/1999 |
| JP | 11-246807 | 9/1999 |
| JP | 11-293165 | 10/1999 |
| JP | 11269418 | 10/1999 |
| JP | 11 349871 | 12/1999 |
| JP | 11349871 | 12/1999 |
| JP | 2000-273372 | 10/2000 |
| JP | 273372 | 10/2000 |
| JP | 2001-64551 | 3/2001 |
| JP | 2001-72905 | 3/2001 |
| JP | 064551 | 3/2001 |
| JP | 2001-354888 | 12/2001 |
| JP | 2001-354889 | 12/2001 |
| JP | 2001-354891 | 12/2001 |
| WO | 9615157 | 5/1996 |
| WO | WO 01/48101 A1 | 7/2001 |

OTHER PUBLICATIONS

Official Action Dated Dec. 22, 2004 with English Translation for Japanese patent application No. 2001-112696.

Official Action Dated Dec. 22, 2004 with English Translation for Japanese patent application No. 2001-112700.

Official Action Dated Dec. 22, 2004 with English Translation for Japanese patent application No. 2001-112704.

Patent Abstracts of Japan JP 11 349871 dated Dec. 21, 1999.

Patent Abstract of Japan JP 10 095941 dated Apr. 14, 1998.

Patent Abstracts of Japan 08283631 dated Oct. 1996.

Patent Abstracts of Japan 2001064551 dated Mar. 2001.

Patent Abstracts of Japan 2000273372 dated Oct. 2000.

Patent Abstract of Japan 11349871 dated Dec. 21, 1999.

Patent Abstract of Japan 10095941 dated Apr. 14, 1998.

Patent Abstract of Japan 02138374 dated May 28, 1990.

Patent Abstract of Japan 01138277 dated May 31, 1989.

Patent Abstract of Japan 62127373 dated Jun. 9, 1987.

Patent Abstract of Japan 5755975 dated Apr. 3, 1982.

Patent Abstract of Japan 0214260 dated Jan. 18, 1990.

Patent Abstract of Japan 11269418 dated Oct. 5, 1999.

* cited by examiner

INK COMPOSITION

This application is a continuation of application Ser. No. 10/009,070 filed on Dec. 7, 2001, now abandoned which is International Application PCT/JP01/03127 filed on Apr. 11, 2001, which designated the U.S., claims the benefit thereof and incorporates the same by reference.

BACKGROUND OF THE INVENTION

1. Field of the Invention

The present invention relates to ink compositions possessing excellent good stability. More particularly, the present invention relates to ink compositions for use in ink jet recording printers.

2. Background Art

Ink jet recording is a method wherein ink is ejected as droplets through fine nozzles to record letters or figures onto the surface of recording media. Ink jet recording systems which have been developed and put to practical use include: a method wherein an electric signal is converted to a mechanical signal using an electrostrictive element to intermittently eject ink reservoired in a nozzle head section, thereby recording letters or symbols on the surface of a recording medium; and a method wherein ink, reservoired in a nozzle head section, in its portion very close to the ejection portion is rapidly heated to create a bubble and the ink is intermittently ejected by volume expansion created by the bubble to record letters or symbols on the surface of a recording medium.

Various properties are required of inks used in the above ink jet recording. For instance, the good drying property of the print, no feathering in prints, uniform printing on the surface of various recording media, and, in the case of multi-color printing, no color-to-color intermixing are required.

Studies have hitherto been made on the addition of an ingredient, which accelerates the penetration of an ink composition into the record, to the ink composition to fast dry the ink composition on recording paper or to prevent mixing of adjacent different color inks.

For example, Japanese Patent Laid-Open No. 14260/1990 describes the use of lower alcohols as an ingredient for accelerating the penetration of ink.

Japanese Patent Laid-Open No. 55975/1982 describes that the addition of a surfactant to an ink composition lowers the surface tension of ink and can improve the penetration of ink.

Japanese Patent Laid-Open No. 157698/1995 describes a 1,2-alkanediol as a penetrating agent. However, all inks, which are specifically disclosed in this publication, contain a dye as a colorant.

SUMMARY OF THE INVENTION

The present inventors have now found that the combination of a glycol monoether and a 1,2-alkanediol in a specific range of a ratio of the glycol monoether to the 1,2-alkanediol in an ink composition can impart excellent ejection stability to the ink composition.

Further, the present inventors have found that the addition of a 1,2-alkanediol in a specific concentration to an ink composition with a pigment dispersed therein with the aid of a dispersant can realize stable ejection of ink. The present inventors have further found that the 1,2-alkanediol, when added even in a relatively small amount, can impart excellent penetration to the ink composition. Furthermore, the present inventors have found that the use of a specific dispersant for dispersing the pigment can improve the level of suppression of ink bleeding and the level of fast drying.

The present invention has been made based on these finding.

Accordingly, it is an object of the present invention to provide an ink composition which, when used in an ink jet recording apparatus, exhibits excellent properties, especially exhibits excellent ink ejection stability.

According to a first aspect of the present invention, there is provided an ink composition comprising at least a colorant, a humectant, a glycol monoether, a 1,2-alkanediol, and water, the weight ratio of the glycol monoether to the 1,2-alkanediol being in the range of 1:5 to 5:1.

According to a preferred embodiment of the present invention, the colorant is a dye or a pigment.

According to a second aspect of the present invention, there is provided an ink composition comprising at least a pigment, a dispersant for dispersing the pigment, a 1,2-alkanediol, and water as a main solvent, the content of the 1,2-alkanediol being 0.5 to 10% by weight based on the total amount of the ink composition.

According to a third aspect of the present invention, there is provided an ink composition comprising at least a pigment, a dispersant for dispersing the pigment, a 1,2-alkanediol, and water as a main solvent, the dispersant being a block polymer resin having an acid value of 70 to 200.

According to a preferred embodiment of the present invention, the ink composition further comprises a nonionic surfactant.

DETAILED DESCRIPTION OF THE INVENTION

Ink Compositions

The ink compositions according to the present invention may be used in recording methods using ink compositions. Recording methods using ink compositions include, for example, an ink jet recording method, a recording method using writing utensils, such as pens, and other various recording methods. Preferably, the ink compositions according to the present invention are used in an ink jet recording method. More preferably, the ink compositions according to the present invention is used in an ink jet recording method using an ink jet head which forms ink droplets through mechanical deformation of an electrostrictive element.

Ink Composition According to First Aspect of Present Invention

The ink composition according to the first aspect of the present invention comprises at least a colorant, a humectant, a glycol monoether, a 1,2-alkanediol, and water. In the first aspect or the present invention, the glycol monoether and the 1,2-alkanediol are considered to mainly function as a penetrating agent.

The ink composition according to the first aspect of the present invention contains the 1,2-alkanediol and the glycol monoether in combination. The combination of the glycol monoether and the 1,2-alkanediol can impart the same level of penetration to the ink composition by the addition of the 1,2-alkanediol in a smaller amount as compared with the use of the 1,2-alkanediol alone. This can relatively reduce the amount of the 1,2-alkanediol added to the ink composition and thus permits more ingredients other than the 1,2-alkanediol to be added. This is in its turn advantageous from the viewpoint of ink design or improvement. Further, the ink composition according to the present invention has excellent ejection stability. Without intending to be bound by theory, the reason is believed to reside in that the wettability of ejection nozzles by the ink composition can be rendered proper. As demonstrated in working examples below, the ink composition according to the prevent invention does not cause the deposition of ink onto a portion around the nozzles. It is considered that this can effectively prevent the occurrence of an ink droplets trajectory directionality problem.

In the ink composition according to the first aspect of the present invention, the glycol monoether and the 1,2-alkanediol should be present in a weight ratio of the glycol monoether to the 1,2-alkanediol in the range of 1:5 to 5:1, preferably in the range of 1:2 to 2:1. The weight ratio falling within the above range is advantageous from the viewpoint of reducing the amount of the 1,2-alkanediol added while maintaining the excellent ejection stability.

Glycol Monoether

In the present invention, the glycol monoether is selected from monoether compounds of glycols, such as mono- or polyethylene glycol and mono- or polypropylene glycol, and is preferably selected from compounds represented by formula (i):

$$R—O—[C_xH_{2x}—O]_y—H \quad (i)$$

wherein

R represents an alkyl group having 1 to 6 carbon atoms, a phenyl group, or a benzyl group, preferably a methyl, ethyl, propyl, or butyl group;

x is 1 to 3, preferably 2 or 3, and y is 1 to 8, preferably 1 to 5, more preferably 1 to 3.

Specific examples of glycol monoethers include ethylene glycol monomethyl ether, ethylene glycol monoethyl ether, ethylene glycol monobutyl ether, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monomethyl ether, triethylene glycol monoethyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether.

In the present invention, among the above glycol monoethers, ethylene glycol mono-n-butyl ether, diethylene glycol mono-n-butyl ether, triethylene glycol mono-n-butyl ether, propylene glycol monobutyl ether, or dipropylene glycol monobutyl ether has high compatibility with the 1,2-alkanediol and hence is preferred.

In the present invention, the content of the glycol monoether is preferably in the range of 0.25 to 10% by weight, more preferably in the range of 0.5 to 5% by weight, based on the total amount of the ink composition. When the glycol monoether content is not less than 0.25% by weight, the glycol monoether in combination with the 1,2-alkanediol can provide satisfactory penetration. When the glycol monoether content is less than 10% by weight, the glycol monoether in combination with other additives can advantageously facilitate the regulation of the viscosity of ink to a value suitable for printing.

1,2-Alkanediol

In the first aspect of the present invention, the 1,2-alkanediol preferably has 4 to 10 carbon atoms. Two or more types of 1,2-alkanediols may be added as a mixture.

According to a preferred embodiment of the present invention, the 1,2-alkanediol is selected from the group consisting of 1,2-butanediol, 1,2-pentanediol, 1,2-hexanediol, 1,2-heptanediol, 1,2-octanediol, and mixtures of these alkanediols. More preferably the 1,2-alkanediol has 6 to 8 carbon atoms, that is, is 1,2-hexanediol, 1,2-heptanediol, or 1,2-octanediol. These alkanediols advantageously have excellent penetration into recording media.

According to a more preferred embodiment of the present invention, the 1,2-alkanediol is 1,2-hexanediol.

The ink composition according to the present invention preferably contains the 1,2-alkanediol in an amount of 0.5 to 10% by weight, more preferably 1 to 5% by weight, based on the total amount of the ink composition. When the 1,2-alkanediol content is not less than 0.5% by weight, satisfactory penetration can be provided. When the 1,2-alkanediol content is not more than 10% by weight, the 1,2-alkanediol in combination with other additives can advantageously facilitate the regulation of the viscosity of ink to a value suitable for printing.

According to a preferred embodiment of the present invention, the combination of the glycol monoether with the 1,2-alkanediol is such that the glycol monoether is glycol monobutyl ether and the 1,2-alkanediol is 1,2-hexanediol. In this case, the amount of the 1,2-alkanediol added is preferably less than 2.5% by weight. The addition of the 1,2-alkanediol in this amount can ensure satisfactory penetration of the ink composition and, in addition, can realize highly stable printing.

Here the glycol monobutyl ether refers to a compound represented by formula (i) wherein R represents a butyl group, x is 2 or 3, and y is 1 to 3. Specific examples of glycol monobutyl ethers include ethylene glycol monobutyl ether, diethylene glycol monobutyl ether, triethylene glycol monobutyl ether, propylene glycol monobutyl ether, and dipropylene glycol monobutyl ether.

Colorant

In the present invention, the colorant is one which can be dissolved or dispersed in an ink composition and, when the ink composition is printed by means of an ink jet recording apparatus, can yield a print of a large number of colors on a recording medium.

In the ink composition according to the present invention, the colorant can be properly selected from dyes and pigments. If necessary, the dye and the pigment may be used in proper combination.

In the present invention, the colorant is preferably a color material, which can be dissolved or dispersed in an aqueous medium, such as an organic dye or pigment. Organic dyes or pigments have high color density per weight and exhibit vivid color and thus are suitable for use in inks.

Dye

According to the present invention, the dye is not particularly limited. For example, various dyes commonly used in ink jet recording, such as direct dyes, acid dyes, foodstuff dyes, basic dyes, reactive dyes, disperse dyes, vat dyes, and soluble vat dyes, may be advantageously used as the dye.

Specific examples of dyes usable in the present invention are as follows.

Specific examples of yellow dyes includes: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4.

Specific examples of magenta dyes include: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14.

Specific examples of cyan dyes includes C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 134, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C.I. Food Blue 1 and 2.

Specific examples of black dyes include: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 38, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, and 18; and C.I. Food Black 2.

In the present invention, when a dye is used as the colorant, the amount of the dye added to the ink composition is preferably 0.5 to 15% by weight, more preferably 0.7 to 10% by weight. When the dye content is not less than 0.5% by weight, the use of the ink composition in an ink jet recording apparatus can provide minimum necessary print density. Further, when the dye content is not more than 15% by weight, the dye in combination with other additives can advantageously facilitate the regulation of the viscosity of ink to a value suitable for printing.

Pigment

In the ink composition according to the first aspect of the present invention, the colorant is a pigment. The pigment is used in the state of dispersion in an alkaline solvent. This type of dispersion is, for example, a dispersion produced by dispersing and stabilizing a material classified as a pigment according to the color index in a solvent with the aid of a dispersant in an alkaline pH region, or a dispersion produced by subjecting a pigment to treatment for imparting a functional group to the surface of the pigment and dispersing the treated pigment in an alkaline solvent.

According to a preferred embodiment of the present invention, the pigment is dispersible with the aid of a dispersant. In this case, any pigment may be used so far as the pigment is dispersible in an ink composition with the aid of a dispersant. Further, in this case, the ink composition preferably contains a dispersant for dispersing the pigment.

Pigments usable in the present invention may be those which, when recorded on recording media, develop any color. Inorganic pigments or organic pigments may be used. Further, a mixture of inorganic and organic pigments may be used as the pigment.

Inorganic pigments include, in addition to titanium oxide and iron oxide, carbon blacks produced by known processes, such as contact, furnace, and thermal processes.

Organic pigments usable herein include: azo pigments including azo lake pigments, insoluble azo pigments, condensed azo pigments, and chelate azo pigments; polycyclic pigments, for example, phthalocyanine pigments, perylene pigments, perinone pigments, anthraquinone pigments, quinacridone pigments, dioxazine pigments, thioindigo pigments, isoindolinone pigments, and quinophthalone pigments; dye-type chelate pigments, for example, basic dye-type chelate pigments and acid dye-type chelate pigments; nitro pigments; nitroso pigments) and aniline black.

Specific examples of pigments usable in the present invention are as follows.

Specific examples of color pigments usable in the present invention include: C.I. Pigment Yellow 1, 2, 3, 4, 5, 6, 7, 8, 9, 10, 11, 12, 13, 14, 14C, 15, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, and 180; and C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, and 219.

Further examples of color pigments include: C.I. Pigment Blue 1, 2, 3, 15, 15:1, 15:2, 15:3, 15:34, 16, 17:1, 22, 25, 56, and 60; C.I. Vat Blue 4, 60, and 63; C.I. Pigment Orange 5, 13, 16, 17, 36, 43, and 51; C.I. Pigment Green 1, 4, 7, 8, 10, 17, 18, and 36; and C.I. Pigment Violet 1 (rhodamine lake), 3, 5:1, 16, 19 (quinacridone red), 23, and 38. Further, for example, predispersed pigments, such as grafted carbons, produced by treating the surface of pigments, for example, with resin may also be used.

Black pigments usable in the present invention include, for example, carbon blacks and C.I. Pigment Black 1. Specific examples of carbon blacks includes carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Colombian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4 A, and Special Black 4.

A single type of pigment may be selected from the above groups of pigments, or alternatively, a plurality of types of pigments may be selected from the above groups of pigments and used in combination.

Dispersant

In the first aspect of the present invention, the pigment is preferably dispersible in an ink composition with the aid of a dispersant for dispersing the pigment.

According to a more preferred embodiment of the present invention, the pigment is added, to the ink composition, as a pigment dispersion prepared by dispersing the pigment in an aqueous medium with the aid of a dispersant.

Preferred dispersants usable for the preparation of the pigment dispersion include conventional surfactants, dispersants commonly used in the preparation of pigment dispersions, for example, polymeric dispersants. It would be apparent to a person having ordinary skill in the art that the dispersant contained in the pigment dispersion would function also as a surfactant for the ink composition.

More preferred dispersants include polymeric dispersants, particularly resin dispersants.

Examples of preferred polymeric dispersants include naturally occurring polymeric compounds, and specific examples thereof include: proteins, such as glue, gelatin, casein, and albumin; naturally occurring rubbers, such as gum arabic and tragacanth, glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose.

Examples of additional preferred polymeric dispersants include synthetic polymers, and examples thereof include: polyvinyl alcohols; polyvinyl pyrrolidones; acrylic resins, such as polyacrylic acid, acrylic acid/acrylonitrile copolymer, salt of acrylic acid/acrylonitrile copolymer, vinyl acetate/acrylic ester copolymer, and acrylic acid/acrylic ester copolymer; styrene/acryl resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer; styrene/maleic acid copolymer; styrene/maleic anhydride copolymer; isobutylene-maleic acid resin; rosin-modified maleic acid resin; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers.

Among them, styrene/acrylic acid copolymer, styrene/methacrylic acid copolymer, acrylic acid/acrylic ester copolymer, and styrene/maleic anhydride copolymer are preferred as the dispersant.

According to a more preferred embodiment of the present invention, the dispersant is a block copolymer resin produced by block copolymerization and has an acid value of 70 to 200, still more preferably 100 to 200. The acid value may be regulated by selecting a suitable monomers as the monomer to be copolymerized.

Here the acid value refers to the number of milligrams of potassium hydroxide necessary for neutralizing free fatty acids contained in one gram of the block copolymer resin.

The selection of this type of dispersant is advantageous in that the bleeding of the ink composition at the time of printing can be prevented and, in addition, fast drying properties of the ink can be improved.

According to a further preferred embodiment of the present invention, the dispersant is preferably one described in Japanese Patent Laid-Open No. 269418/1999. Specifically, a suitable dispersant is a block copolymer represented by AB, ABA, or ABC. In this context, A is a hydrophilic block, B is a hydrophobic block, and contains at least 30% by weight of an non-acrylic monomer selected from the group consisting of the following monomers (1) to (4) based on the weight of the B, and C may be any desired block.

$$CH_2=CH-R \tag{1}$$

wherein R represents a $C_6$–$C_{20}$ substituted or unsubstituted alkyl, aryl, aralkyl, or alkaryl group. Here the substituted alkyl, aryl, aralkyl, or alkaryl group refers to an alkyl, aryl, aralkyl, or alkaryl group containing one or two or more substituents which do not hinder the polymerization process, including, for example, hydroxy, amino, ester, acid, acyloxy, amide, nitrile, halogen, haloalkyl, or alkoxy. Specific examples thereof include styrene, α-methylstyrene, vinylnaphthalene, vinylcyclohexane, vinyltoluene, vinylanisole, vinylbiphenyl, and vinyl-2-norbornene.

$$CH_2=CH-OR^1 \tag{2}$$

wherein $R^1$ represents a $C_3$–$C_{20}$ substituted or unsubstituted alkyl, aryl, aralkyl, or alkaryl group. Here the substituted alkyl, aryl, aralkyl, or alkaryl group are as defined above. Specific examples thereof include vinyl n-propyl ether, vinyl t-butyl ether, vinyl decyl ether, vinyl iso-octyl ether, vinyl octadecyl ether, and vinyl phenyl ether.

$$CH_2=CH-O-C(O)-R^1 \tag{3}$$

wherein $R^1$ is as defined in (2) above. Specific examples thereof include vinyl propionate, vinyl butyrate, vinyl n-decanoate, vinyl stearate, vinyl laurate, and vinyl benzoate.

$$CH_2=CH-NR^2R^3 \tag{4}$$

wherein $R^2$ and $R^3$ are each independently selected from the group consisting of H and $C_2$–$C_{20}$ substituted or unsubstituted alkyl, aryl, aralkyl, and alkaryl groups, provided that $R^2$ and $R^3$ do not simultaneously represent H. Here the substituted alkyl, aryl, aralkyl, or alkaryl group is as defined above. Specific examples thereof include N-vinylcarbazole and vinylphthalimide.

In the block copolymer having the AB, ABA, or ABC structure, the characters A, B, and C indicate blocks of the block copolymer. Specifically, different characters indicate blocks different from each other in monomer composition, and the same characters indicate blocks having the same monomer composition. Accordingly, an AB block copolymer is a diblock in which the two blocks are different from each other in monomer composition, and an ABA block copolymer is composed of three blocks wherein only two blocks are different from each other in monomer composition (that is, two blocks A are identical to each other in monomer composition). An ABC block copolymer also hare three blocks. In this case, however, all of the three blocks are different from one another.

In the above structure, the block B, even when any block copolymer is used, is hydrophobic and, in addition, can be attached to the colorant. The block A is hydrophilic and, at the same time, is soluble in an aqueous vehicle. The third block (any one of block A and block C) may be any desired block and may be used to finely regulate the balance between hydrophobicity and hydrophilicity of the polymer.

Therefore, this third block may have the same composition as the hydrophilic block, for example, ABA, or may have a composition which is different from any of A and B, for example, ABC. Here the aqueous vehicle generally refers to water or a water-soluble organic solvent.

The size of the hydrophobic block should be large enough to form ant effective bond to the surface of the pigment. The number average molecular weight is at least 300, preferably at least 500. The hydrophilic block also should be large enough to create a sterically stabilized mechanism and an electrostatically stabilized mechanism for stable dispersion, and the balance in size between the hydrophilic block and the hydrophobic block is preferably obtained so that the whole polymer is soluble in an aqueous vehicle.

The hydrophobic block may also contain other ethylenically unsaturated monomer, that is, an acrylic monomer. Specific examples of this type of monomers include $C_1$ to $C_{20}$ acrylic or methacrylic esters, for example, methyl acrylate, ethyl acrylate, n-butyl acrylate, 2-ethylhexyl acrylate, methyl methacrylate, ethyl methacrylate, n-butyl methacrylate, t-butyl methacrylate, 2-ethylhexyl methacrylate, and cyclohexyl methacrylate.

The hydrophilic block may be prepared from an ethylenically unsaturated monomer. This hydrophilic block should be soluble in the selected aqueous vehicle, and may contain an ionizable monomer in an amount of up to 100% by weight, preferably at least 50% by weight, based on the total weight of the hydrophilic block. The ionizable monomer to be selected varies depending upon desired ionic properties of inks in selected applications. In the case or an anionic block copolymer dispersant, the ionic monomer is mainly an acid group- or acid precursor group-containing monomer. Specific examples of useful monomers include acrylic acid, methacrylic acid, crotonic acid, itaconic acid, itaconic monoesters, maleic acid, maleic monoesters, fumaric acid, and fumaric monoesters.

In the case of a cationic block copolymer dispersant, an ionizable monomer preferable for the hydrophilic portion is an amine-containing monomer. The amine group may be a primary, secondary, or tertiary amine group, or a mixture of two or more of these groups. Specific examples of amine-containing monomers include N,N-dimethylaminoethyl acrylate, N,N-dimethylaminoethyl methacrylate, N,N-diethylaminoethyl methacrylate, t-butylaminoethyl methacrylate, 2-N-morpholinoethyl acrylate, 2-N-morpholinoethyl methacrylate, 4-aminostyrene, 2-vinylpyridine, 4-vinylpyridine, and vinylimidazole.

A nonionic hydrophilic monomer or a water-soluble monomer may be properly used to finely regulate the hydrophobicity/hydrophilicity balance and, in addition, to regulate the solubility properties of the block copolymer. The nonionic hydrophilic monomer or the water-soluble monomer can be easily copolymerized with the hydrophobic block or hydrophilic block or any third different block such as the block C in the ABC block copolymer to attain a desired effect. Specific examples of useful nonionic hydrophilic monomers or water-soluble monomers include alkyl acrylates and alkyl methacrylates wherein the alkyl group has 1 to 12 carbon atoms, for example, methyl acrylate, methyl methacrylate, ethyl acrylate, ethyl methacrylate, butyl acrylate, and butyl methacrylate and, in addition, acrylamide and methacrylamide.

The block copolymer as the dispersant usable in the present invention may be efficiently produced by the preparation of a plurality of blocks using a macromonomer as an intermediate in a simultaneous and continuous manner. The terminal macromonomer having a polymerizable double bond becomes one of blocks in the block copolymer and is first prepared. This is then copolymerized with a monomer selected for the second block. In the case of ABA and ABC triblock copolymers, the synthesis of the hydophilic, macromonomer as the first block in the first stage is preferred. In the case of an AB block copolymer, the hydrophobic macromonomer or the hydrophilic macromonomer is a first stage useful in the synthesis. The macromonomor is suitably prepared by free radical polymerization. In this case, cobalt (II) and cobalt(III) complexes are used as a catalytic chain transfer agent or an organic chain transfer agent for enabling chain transfer. Organic chain transfer agents include allyl sulfide, allyl bromide, and vinyl end group-containing methacrylate oligomers including dimers, α-methylstyrene dimers, and related compounds.

The block copolymer may be synthesized through a macromonomer as taught in International Publication WO 96/15157 (June, 1996). The block copolymer useful in the present invention has a weight average molecular weight of about 1,000 to 50,000, preferably 2,000 to 20,000.

The AB block copolymer prepared by the above method is terminated with a polymerizable double bond which is further polymerized with other group in the monomer to form an ABA or ABC block copolymer through conventional free radical polymerization in the above method.

A large number of conventional organic solvents are usable as a polymerization medium for the preparation of both the macromonomer and the block copolymer. Organic solvents usable herein include, but are not limited to, alcohols, such as methanol, ethanol, n-propanol, and isopropanol, ketones, such as acetone, butanone, pentanone, and hexanone, tetrahydrofuran, diethyl ether, and commonly available cellusolves and carbitols, for example, others, such as ethylene glycol monoalkyl ethers, ethylene glycol dialkyl ethers, polyethylene glycol monoalkyl ethers, and polyethylene glycol dialkyl ethers, alkyl esters of acetic acid, propionic acid, and butyric acid, glycols, such as ethylene glycol, and mixtures of these organic solvents.

A salt of an ionizable group should be produced in the hydrophilic portion to render the block copolymer soluble in the aqueous vehicle. The salt of the acid group may be prepared by neutralizing the acid group with a neutralizing agent. Specific examples of useful bases include: hydroxides of alkali metals, such as lithium hydroxide, sodium hydroxide, and potassium hydroxide; carbonates and bicarbonates of alkali metals, such as sodium carbonate, potassium carbonate, sodium bicarbonate, and potassium bicarbonate; organic amines, such as monomethylamine, dimethylamine, trimethylamine, morpholine, and N-methylmorpholine; organic alcohol amines, such as N,N-dimethylethanolamine, N-methyldiethanolamine, monoethanolamine, diethanolamine, and triethanolamine; ammonium salts, such as ammonium hydroxide and tetraalkylammonium hydroxide; and pyridine. In the case of a cationic block copolymer dispersant, the amine group is neutralized with acids including organic acids and inorganic acids. Specific, examples of useful acids include: organic acids, such as acetic acid, propionic acid, formic acid, and oxalic acid; hydroxylated acids, such as glycolic acid and latetic acid; halogenic acids, such as hydrochloric acid and hydrobromic acid; and other inorganic acids, such as sulfuric acid, phosphoric acid, and nitric acid.

According to a preferred embodiment of the present invention, the dispersant is used in an amount of 0.1 to 2.0% by weight, more preferably 0.2 to 1.0% by weight, based on the pigment.

The pigment may be dispersed by a conventional method. For example, the dispersant and the pigment are mixed into water which has been made alkaline, for example, with sodium hydroxide, potassium hydroxide, lithium hydroxide, sodium carbonate, sodium hydrogencarbonate, aqueous ammonia, triethanolamine, diethanolamine, triethylamine, or aminomethyl propanol, and the mixture is placed in a dipsergator, such as a ball mill, a sand mill, an attritor, a roll mill, an agitator mill, a Henschel mixer, a colloid mill, an ultrasonic homogenizer, a jet mill, or an angmill to disperse the pigment. in this case, the pigment is regulated to an average particle diameter of 25 to 1000 nm, preferably 50 to 250 nm. Further, in this case, preferably, filtration, for example, through a metallic filter or a membrane filter, or centrifugation is carried out to remove coarse particles or foreign matter causative of clogging.

In the first aspect of the present invention, when a pigment is used as the colorant, the amount of the pigment added to the ink composition is preferably 0.5 to 15% by weight, more preferably 0.7 to 12% by weight.

In the present invention, a single type of a colorant may be selected from the above groups of dyes and pigments, or alternatively, a plurality of types of dyes and/or pigments may hp selected from the above groups of dyes and pigments and used in combination.

Humectant

In the first aspect of the present invention, any humectant may be used so far as the humectant, when used in the ink composition, can suppress drying of ink to prevent the solidification of ink at ejection nozzles of an ink jet recording apparatus.

The humectant used in the present invention is preferably a material having moisture retaining properties or hygroscopic properties among water-soluble organic solvents, and specific examples of preferred humectants include: polyols, such as glycerin, ethylene glycol, diethylene glycol, triethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, and pentaerythritol 2-pyrrolidone; and N-methyl-2-pyrrolidone. Further, water-soluble hygroscopic materials, for example, urea compounds, such as urea, thiourea, ethyleneurea, and 1,3-dimethylimidazolidinones, lactams, such as ε-caprolactam, solid glycerins, such as trimethylolpropane and trimethylolethane, and saccharides, such as maltitol, sorbitol, gluconic lactone, and maltose.

The amount of these humectants added may be such that, the humectants, together with other ingredients of an ink composition, provide an ink viscosity of not more than 25 mPa·s at 25° C.

Nonionic Surfactant

In the first aspect of the present invention, the ink composition preferably further comprises a nonionic surfactant. The use of the nonionic surfactant is advantageous from the viewpoint of satisfactorily spreading the ink composition even in a small amount on recording paper. Further, the use of the nonionic surfactant is advantageous in that an ink composition can be provided which is less foamable than an ink composition prepared using an ionic surfactant.

Nonionic surfactant usable herein include, for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides. Further, acetylene glycol surfactants and the like described later may also be used. These surfactant may be used alone or in combination of two or more.

Specific example of such nonionic surfactants include Nissan Nonion K-211, K-220, P-213, E-215, E-220, S-215, S-220, RS-220, NS-212, and NS-220 (all the above products being manufactured by Nippon Oils & Fats Co., Ltd.).

According to a preferred embodiment of the present invention, the ink composition further contains an acetylene glycol surfactant as the nonionic surfactant.

Specific examples of preferred acetylene glycol surfactants usable in the present invention include compounds represented by formula (a):

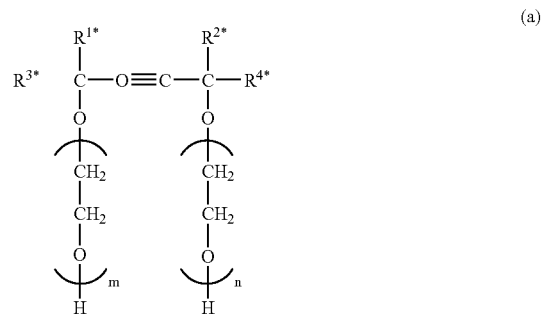

wherein $0 \leqq m+n \leqq 50$; and $R^{1*}$, $R^{2*}$, $R^{3*}$, and $R^{4*}$ each independently represent an alkyl group, preferably an alkyl group having 1 to 6 carbon atoms.

Among the compounds represented by formula (a), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by formula (a). Specific examples thereof include Surfynol 61, Surfynol 82, Surfynol 104, Surfynol 440, Surfynol 465, Surfynol 485, and Surfynol TG (all the above products being available from Air Products and Chemicals Inc.) and OLFINE STG and OLFINE E 1010 (tradenames; manufactured by Nissin Chemical Industry Co., Ltd.). These acetylene glycol surfactants may be used alone or in combination of two or more.

The amount of the nonionic surfactant added is preferably in the range of about 0.1 to 5% by weight, more preferably in the range of about 0.5 to 2% by weight, based on the ink composition. When the nonionic surfactant content is not less than 0.1% by weight, the combined use of the nonionic surfactant and the penetrating agent composed of the glycol monoether and the 1,2-alkanediol is advantageous from the viewpoint of spreading ink in the transverse direction of paper upon the impaction of ink on the recording paper. On the other hand, when the nonionic surfactant content is not more than 5% by weight, the nonionic surfactant, together with other additives, can easily regulate the viscosity of ink to a value suitable for printing.

Water and Other Ingredients

The ink composition according to the present invention comprises or water as a main solvent. Water is preferably pure water obtained by ion exchange, ultrafiltration, reverse osmosis, distillation or the like, or ultrapure water. Further, water, which has been sterilized, for example, by ultraviolet irradiation or by addition of hydrogen peroxide, is preferred because, when the ink composition is stored for a long period of time, it can prevent the growth of mold, bacteria or the like.

The ink composition according to the present invention may further contain other water-soluble organic solvents other than described above.

The ink composition according to the present invention may further contain other optional ingredients. Examples of other ingredients usable herein include nozzle clogging preventives, preservatives/antimolds, antioxidants/ultraviolet absorbers, electric conductivity adjustors, pH adjustors, surface tension modifiers, solubilizers, viscosity modifiers, and oxygen absorbers.

pH adjustors include hydroxides of alkali metals or amines, for example, lithium hydroxide, sodium hydroxide, potassium hydroxide, triethanolamine, diethanolamine, and aminomethylpropanol.

Antioxidants/ultraviolet absorbers include: allophanates, such as allophanate and methyl allophanate; biurets, such as biuret, dimethylbiuret, and tetramethylbiuret; L-ascorbic acid and salts thereof; Tinuvin 328, 900, 1130, 394, 292, 123, 144, 622, 770, and 292, Irgacor 252 and 153, and Irganox 1010, 1076, 1035, and MD 1024, manufactured by Ciba-Geigy; and lanthanide oxides.

Preservatives/antimolds include, for example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BDN, Proxel GXL, Proxel XL-2, and Proxel TN, manufactured by ICI).

Ink Compositions According to Second and Third Aspects of Invention

The ink composition according to the second aspect of the present invention comprises at least a pigment, a dispersant for dispersing the pigment, a 1,2-alkanediol, and water as a main solvent, the content of the 1,2-alkanediol being 0.5 to 10% by weight based on the total amount of the ink composition.

The ink composition according to the third aspect of the present invention comprises at least a pigment, a dispersant for dispersing the pigment, a 1,2-alkanediol, and water as a main solvent, the dispersant being a block polymer resin having an acid value of 70 to 200.

The ink compositions according to the second and third aspects of the present invention can prevent nozzle clogging and can maintain stable print quality. That is, the ink compositions according to the present invention have excellent stability in ejection of ink through the head and stability against nozzle clogging.

Further, the ink compositions according to the present invention possess excellent penetration into recording media. In general, the addition of a penetrating agent, such as triethylene glycol monobutyl ether (TEGmBE), is known to improve the penetration of the ink composition. When the ink compositions according to the second and third aspects of the present invention are used, the same level of penetration into media can be realized in a smaller amount of the 1,2-alkanediol than the case where a penetrating agent, such as TEGmBE, is used. For this reason, according to the present invention, the amount of the penetrating agent added to the ink composition can be relatively reduced. This is advantageous from the viewpoint of improving the stability of the state of the dispersion of the pigment in the ink composition, and thus can improve the storage stability and reliability of the ink composition. Further, in the ink compositions, the allowance of ingredients other than the colorant can be increased. This is advantageous from the viewpoint of ink composition design or improvement. Further, in the present invention, the increase in viscosity of the ink composition can be suppressed on a higher level as compared with conventional penetrating agents, such as TEGmBE. Therefore, the amount of the humectant added can also be increased.

1,2-Alkanediol

In the second and third aspects of the present invention, the 1,2-alkanediol preferably has 4 to 10 carbon atoms. A mixture of two or more 1,2-alkanediols may also be added.

In a preferred embodiment or the present invention, the 1,2-alkanediol is selected from the group consisting of 1,2-butanediol, 1,2-pentanediol, 1,2-hexanediol, 1,2-heptanediol, and a mixture thereof. These alkanediols are advantageous from the viewpoint of excellent penetration into recording media.

According to a more preferred embodiment of the present invention, the 1,2-alkanediol is preferably 1,2-hexanediol or 1,2-pentanediol, more preferably 1,2-hexanediol.

The content of the 1,2-alkanediol is in the range of 0.5 to 10% by weight, preferably 1 to 5% by weight, based on the total amount of each of the ink compositions according to the present invention. When the 1,2-alkanediol content is not less than 0.5% by weight, the penetration of the ink composition is satisfactory. On the other hand, when the 1,2-alkanediol content is not more than 10% by weight, the 1,2-alkanediol, together with other additives, can advantageously easily regulate the viscosity of ink to a value suitable for printing.

In the second and third aspects of the present invention, when the 1,2-alkanediol is 1,2-butanediol, the ink composition according to the present invention preferably contains 3 to 10% by weight, more preferably 5 to 10% by weight, of 1,2-butanediol. When the 1,2-alkanediol is 1,2-pentanediol, the ink compositions according to the present invention each preferably contain 3 to 10% by weight, more preferably 3 to 7% by weight, of 1,2-pentanediol. When the 1,2-alkanediol is 1,2-hexanediol, the ink compositions according to the present invention each preferably contain 1 to 6% by weight, more preferably 3 to 5% by weight, of 1,2-hexanediol. When the 1,2-alkanediol is 1,2-heptanediol, the ink composition preferably contains 0.5 to 3% by weight, more preferably 1 to 2% by weight, of 1,2-heptanediol.

In the second and third aspects of the present invention, the ink compositions preferably contain, as the 1,2-alkanediol, 1 to 6% by weight of 1,2-hexanediol.

Colorant

In the ink compositions according to the second and third aspects of the present invention, a pigment is used as the colorant. In the present invention, any pigment may be selected so far as the pigment is dispersible in the ink composition with the aid of a dispersant.

In the second and third aspects of the present invention, the pigment may be the same as that described above in connection with the first aspect of the present invention.

In the second and third aspects of the present invention, the particle diameter of the pigment is preferably not more than 0.2 μm, more preferably 0.05 to 0.15 μm.

In the second and third aspects of the present invention, the content of the pigment is preferably 0.5 to 15% by weight, more preferably 0.75 to 10% by weight, based on the total amount of the ink composition.

Dispersant

In the second and third aspects of the present invention, the pigment is dispersed in the ink compositions with the aid of a dispersant for dispersing a pigment.

According to a preferred embodiment of the present invention, the pigment is preferably added, to ink, as a pigment dispersion produced by dispersing the pigment in an aqueous medium with the aid of a dispersant.

In the second and third aspects of the present invention, the dispersant may be the same as that described above in connection with the first aspect or the present invention.

Nonionic Surfactant

In the second and third aspects of the present invention, the ink compositions preferably further contain a nonionic surfactant. Nonionic surfactants usable herein are the same as those described above in connection with the first aspect of the present invention.

The amount of the nonionic surfactant added is preferably in the range of about 0.1 to 5% by weight, more preferably in the range of about 0.5 to 2% by weight, based on each of the ink composition.

Water and Other Ingredients

In the second and third aspects of the present invention, the ink compositions comprise water as a main solvent. Water in preferably pure water obtained by ion exchange, ultrafiltration, reverse osmosis, distillation or the like, or ultrapure water. Further, water, which has been sterilized by ultraviolet irradiation or by addition of hydrogen peroxide, is preferred because, when the ink composition is stored for a long period of time, it can prevent the growth of mold, bacteria or the like.

In the second and third aspects of the present invention, the ink compositions may further contain, in addition to water, a water-soluble organic solvent as the solvent from the viewpoint of regulating the moisture retaining property of ink or imparting penetration to ink.

In the present invention, the water-soluble organic solvent for regulating the moisture retaining property of ink is added as a humectant or a drying accelerator to the ink compositions according to the present invention. Further, the water-soluble organic solvent for imparting penetration to ink is added as a penetration accelerator to the ink composition of the present invention.

Specific examples of water-soluble organic solvents for regulating the moisture retaining property of ink include: monohydric alcohols, such as methanol, ethanol, n-propanol, iso-propanol, n-butanol, sec-butanol, tert-butanol, iso-butanol, and n-pentanol; polyhydric alcohols, such as glycerin, ethylene glycol, diethylene glycol, triethylene glycol, polyethylene glycol, propylene glycol, butylene glycol, dipropylene glycol, polypropylene glycol, thiodiglycol, hexylene glycol, 1,3-propanediol, 1,4-butanediol, 1,5-pentanediol, 1,6-hexanediol, 1,2,6-hexanetriol, and pentaerythritol; 2-pyrrolidone, N-methyl-2-pyrrolidone, urea, thiourea, ethyleneurea, and 1,3-dimethyl-2-imidazolidinone.

In the second and third aspects of the present invention, the water-soluble organic solvent for regulating the moisture retaining property of ink may be added as a humectant to the ink composition according to the present invention. In the present invention, the humectant is mainly used for suppressing drying of ink to prevent the solidification of ink at ejection nozzles of an ink jet recording apparatus. Humectants usable in the present invention include, in addition to the above-described water-soluble organic solvents, for example, lactams such as $\epsilon$ caprolactam, solid glycerins such as trimethylolpropane and trimethylolethane, and saccharides such as maltitol, sorbitol, gluconolactone, and maltose.

Preferred water-soluble organic solvents for imparting penetration to ink, that is, penetrating agents, include glycol monoethers.

In the second and third aspects of the present invention, glycol monoethers usable herein are those described above in connection with the first aspect of the present invention.

In the second and third aspects of the present invention, the combined use of the 1,2-alkanediol and the glycol monoether can impart the same level of penetration to the ink compositions by the addition of the 1,2-alkanediol in a smaller amount as compared with the use of the 1,2-alkanediol alone. Further, the deposition of ink onto ejection nozzles caused by the addition of the 1,2-alkanediol can be effectively prevented by using the glycol monoether in combination with the 1,2-alkanediol. By virtue of this in combination with the effect of reducing the amount or the 1,2-alkanediol added, ink compositions having high printing stability can be provided.

In the present invention, when the ink compositions further contain the glycol monoether, the amount of glycol monoether added is preferably in the range of 0.25 to 10% by weight based on the ink composition. When the amount of the glycol monoether added is in the above defined range, the combined use of the glycol monoether and the 1,2-alkanediol can provide satisfactory penetration. Further, the glycol monoether, together with other additives, can regulate the viscosity of ink to a value suitable for printing.

The ratio (weight ratio) of the glycol monoether to the 1,2-alkanediol is preferably in the range of 1:5 to 5:1, more preferably in the range of 1:2 to 2:1. A weight ratio of the glycol monoether to the 1,2-alkanediol in the above defined range is advantageous from the viewpoint of reducing the amount of the 1,2-alkanediol added.

The water-soluble organic solvent has been described above in terms of organic solvents for regulating the moisture retaining property and organic solvents for imparting the penetration. However, it should be noted that organic solvents mentioned above as regulating the moisture retaining property sometimes function also to impart penetration to the ink, and organic solvents mentioned above as imparting penetration sometimes function also as the humectant.

The ink compositions according to the second and third aspects of the present invention may further contain a surfactant from the viewpoint of attaining promoted penetration and reliable ejection and yielding good images. Surfactants of this type include, in addition to the above-described nonionic surfactants, for example, anionic surfactants, such as sodium dodecylbenzenesulfonate, sodium laurylate, and an ammonium salt of polyoxyethylene alkyl ether sulfates, cationic surfactants, and amphoteric surfactants. They may be used alone or in combination of two or more.

The surface tension of the ink compositions according to the present invention is in the range of about 20 to 50 mN/m, preferably in the range of about 25 to 40 mN/m.

The ink compositions according to the second and third aspects of the present invention may further contain other optional ingredients. Examples of other optional ingredients usable herein include nozzle clogging preventives, preservatives, antioxidants/ultraviolet absorbers, electric conductivity adjustors, pH adjustors, solubilizers, viscosity modifiers, and oxygen absorbers.

Examples of preservatives include sodium benzoate, pentachlorophenol sodium, 2-pyridinethiol-1-oxide sodium, sodium sorbate, sodium dehydroacetate and 1,2-dibenzothiazolin-3-one (Proxel CRL, Proxel BDN, Proxel GXL, Proxel XL-2, and Proxel TN, manufactured by ICI).

Examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxides, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such an urea, thiourea, and tetramethylurea; allophanates, such as allophanate and methyl allophanate; biurets, such as biuret, dimethylbiuret, and tetramethylbiuret; and L-ascorbic acid and salts thereof.

Further, in the present invention, a single type of other optional ingredient may be selected from the above groups of other optional ingredients, or alternatively, a plurality of types of other optional ingredients may be selected from the above groups of other optional ingredients and used in combination.

In the present invention, the amounts of all the ingredients of the ink composition are preferably selected so that the viscosity of the ink composition is not more than 10 mPa·s at 20° C.

The ink compositions according to the second and third aspects of the present invention may be prepared by dispersing and mixing the above ingredients together by means of a conventional suitable method. A preferred method is as follows. A mixture of all the ingredients except for the organic solvent and the volatile ingredient is mixed by means of a suitable dispergator, for example, a ball mill, a roll mill, a sand mill, an attritor, an agitator mill, a Henschel mixer, a colloid mill, a jet mill, an angmill, or an ultrasonic homogenizer, to prepare a homogeneous composition, and the organic solvent and the volatile ingredient are added to the homogeneous composition. Thereafter, preferably, filtration under reduced pressure or under applied pressure, for example, through a metallic filter or membrane filter, or centrifugation is carried out to remove coarse particles and foreign matter.

Recording Method

According to the present invention, there is provided a recording method comprising the step of depositing the ink composition onto a recording medium to perform printing. Recording methods using an ink composition include, for example, an ink jet recording method, screen printing, recording methods with writing implements, such as pens, and other various printing methods.

In a preferred embodiment of the present invention, there is provided an ink jet recording method comprising the steps of: electing droplets of the ink composition according to the present invention; and depositing the droplets onto a recording medium to perform printing.

In the present invention, any system may be used in the ink jet recording method so far ac the ink composition is ejected as droplets through fine nozzles and the ink droplets are deposited onto a recording medium. Examples of such systems include a method wherein an ink jet head having a mechanism utilizing the response of an electrostrictive element is used, that is, a method wherein pressure and printing information signals are simultaneously added to liquid ink by means of an electrostrictive element to cause mechanical deformation which ejects ink droplets to form an image, a method wherein thermal energy is applied to rapidly expand the volume of liquid ink, a method wherein static electricity-driven ejection is used, and a method wherein pressure is applied to liquid ink by means of a small pump and the nozzles are mechanically vibrated, for example, by means of a crystal vibrator, to forcibly eject ink droplets.

According to the present invention, in the above various ink jet recording methods, printing can be carried out at a relatively low ink ejection speed or not more than 10 m/sec, and the use of the ink composition according to the present invention can prevent the deposition of ink onto ejection nozzles and can realize stable ink jet recording.

According to a more preferred embodiment of the present invention, the ink jet recording method according to the present invention is preferably such that an ink jet head is used wherein ink droplets are formed by mechanical deformation using an electrostrictive element.

Further, according to the present invention, there is provided a record produced by the above recording method.

EXAMPLES

The following examples further illustrate the present invention, but should not be construed as limiting the soups of the present invention.

Test A

Ink Compositions A1 to A11 were prepared as follows.

Ink Composition A1

C.I. Direct Black 32 (6 g) as a black dye, 10 g of glycerin, 5 g of diethylene glycol, 1 g of diethylene glycol monomethyl ether, 5 g of 1,2-pentanediol, 0.1 g of potassium hydroxide as a pH adjustor, and 0.5 g of aminomethylpropanol were mixed together. Ultrapure water was added to the mixture to bring the total amount of the mixture to 100 g. Thus, a mixed solution was prepared. This mixed solution was stirred for 2 hr, and filtered through a membrane filter with a pore diameter of about 1.2 μm (manufactured by Nihon Millipore, Ltd.) to prepare an ink composition A1.

Ink Composition A2

C.I. Direct Blue 86 (3 g) as a cyan dye, 5 g of glycerin, 10 g of triethylene glycol, 3 g of diethylene glycol monoethyl ether, 3 g of 1,2-pentanediol, and 0.1 g of potassium hydroxide as a pH adjustor were mixed together. Ultrapure water was added to the mixture to bring the total amount of the mixture to 100 g. Thus, a mixed solution was prepared. This mixed solution was stirred for 2 hr, and filtered through a membrane filter with a pore diameter of about 1.2 μm (manufactured by Nihon Millipore, Ltd.) to prepare an ink composition A2.

Ink Composition A3

C.I. Pigment Yellow 74 (100 g) as a yellow pigment, 150 g of Joncryl J-62 (manufactured by Johnson Polymer Corp.) as a water-soluble resin dispersant, 6 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a yellow pigment dispersion A3 was prepared.

The yellow pigment dispersion A3 (30 g), 15 g of glycerin, 1.5 g of ethylene glycol monobutyl ether, and 4 g of 1,2-pentanediol were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was then stirred for 2 hr, and was filtered through a membrane filter with a pore diameter of about 1.2 μm (manufactured by Nihon Millipore, Ltd.). Thus, an ink composition A3 was prepared.

Ink Composition A4

C.I. Pigment Blue 15 (100 g) as a cyan pigment, 100 g of Joncryl J-62 (manufactured by Johnson Polymer Corp.) as a water-soluble resin dispersant, 4.5 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a cyan pigment dispersion A4 was prepared.

The cyan pigment dispersion A4 (30 g), 10 g of glycerin, 5 g of diethylene glycol, 2 g of triethylene glycol monoethyl ether, and 3 g of 1,2-hexanediol were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. This mixed solution was stirred for 2 hr, and was then filtered through a membrane filter with a pore diameter of about 1.2 μm (manufactured by Nihon Millipore, Ltd.). Thus, an ink composition A4 was prepared.

Ink Composition A5

Color Black S 170 (manufactured by Degussa) (100 g), which is carbon black as a black pigment, 150 g of Joncryl J-62 (manufactured by Johnson Polymer Corp.) as a water-soluble resin dispersant, 6 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove course particles. The filtrate was diluted with water to bring the concentration of the pigment to 10% by weight. Thus, a black pigment dispersion A5 was prepared.

The black pigment dispersion A5 (50 g), 8 g of glycerin, 6 g of triethylene glycol, 2 g of diethylene glycol monobutyl ether as a glycol monoether, and 2 g of 1,2-hexanodiol were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. This mixed solution was stirred for 2 hr, and was then filtered through a membrane filter with a pore diameter of about 1.2 μm (manufactured by Nihon Millipore, Ltd.). Thus, an ink composition A5 was prepared.

Ink Composition A6

C.I. Direct Black 32 (6 g) as a black dye, 10 g of glycerin, 5 g of diethylene glycol, 1 g of diethylene glycol monomethyl ether, 4 g of 1,2-pentanediol, 1.5 g of Nissan Nonion NS-220 (manufactured by Nippon Oils & Fats Co., Ltd.) as a nonionic surfactant, 0.1 g of potassium hydroxide as a pH adjustor, and 0.5 g of aminomethylpropanol were mixed together. Ultrapure water was added to the mixture to bring the total amount of the mixture to 100 g. Thus, a mixed solution was prepared. This mixed solution was stirred for 2 hr, and filtered through a membrane filter with a pore diameter of about 1.2 μm (manufactured by Nihon Millipore, Ltd.) to prepare an ink composition A6.

Ink Composition A7

C.I. Direct Blue 86 (3 g) as a cyan dye, 5 g of glycerin, 10 g of triethylene glycol, 2 g of diethylene glycol monoethyl ether, 2 g of 1,2-pentanediol, 1 g of Surfynol 440 (manufactured by Air Products and Chemicals, Inc.) as an acetylene glycol surfactant, and 0.1 g of potassium hydroxide as a pH adjustor were mixed together. Ultrapure water was added to the mixture to bring the total amount of the mixture to 100 g. Thus, a mixed solution was prepared. This mixed solution was stirred for 2 hr, and was filtered through a membrane filter with a pore diameter of about 1.2 μm (manufactured by Nihon Millipore, Ltd.) to prepare an Ink composition A7.

Ink Composition A8

Bonjet Black CW-1 (manufactured by Orient Chemical Industries, Ltd.) (10 g), that is, a carbon black, as a black pigment, which has been treated for introducing a functional group into the surface of the pigment and then dispersed, 5 g of glycerin, 10 g of triethylene glycol, 2 g of diethylene glycol monoethyl ether, 2 g of 1,2-pentanediol, 1 g of Surfynol 440 (manufactured by Air Products and Chemicals, Inc.) as an acetylene glycol surfactant, and 0.5 g of triethanolamine as a pH adjustor were mixed together. Ultrapure water was added to the mixture to bring the total amount of the mixture to 100 g. Thus, a mixed solution was prepared. This mixed solution was stirred for 2 hr, and was filtered through a membrane filter with a pore diameter of about 1.2 μm (manufactured by Nihon Millipore, Ltd.) to prepare an ink composition A8.

Ink Composition A9

C.I. Pigment Blue 15 (100 g) as a cyan pigment, 100 g of Joncryl J-62 (manufactured by Johnson Polymer Corp.) as a water-soluble resin dispersant, 4.5 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a cyan pigment dispersion A9 was prepared.

The cyan pigment dispersion A9 (30 g), 10 g of glycerin, 5 g of diethylene glycol, 2 g of triethylene glycol monoethyl ether, 2 g of 1,2-hexanediol, and 1 g of Surfynol 440 (manufactured by Air Products and Chemicals, Inc.) as an acetylene glycol surfactant were mixed together. Ultrapure water was added to the mixture to bring the total amount of the mixture to 100 g. Thus a mixed solution was prepared. The mixed solution was then adjusted to pH 9.5 by the addition of triethanolamine as a pH adjustor. This mixed solution was stirred for 2 hr, and was then filtered through a membrane filter with a pore diameter of about 1.2 μm (manufactured by Nihon Millipore, Ltd.). Thus, an ink composition A9 was prepared.

Ink Composition A10

An ink composition A10 was prepared in the same manner as used in the preparation of the ink composition A1, except that 6 g of 1,2-hexanediol was added instead of 1 g of diethylene glycol monomethyl ether and 5 g of 1,2-penetanediol.

Ink Composition A11

An ink composition A11 was prepared in the some manner as used in the preparation of the ink composition A5, except that 7 g at 1,2-hexanediol was added instead of 2 g of diethylene glycol monobutyl ether and 2 g of 1,2-hexanediol.

Evaluation Test A

Each of the ink compositions A1 to A11 was printed by means of a piezoelectric on-demand ink jet recording apparatus MJ-930C manufactured by Seiko Epson Corporation on a neutral plain paper Xerox-P manufactured by Fuji Xerox Co., Ltd.

The prints thus obtained for each of the ink compositions were inspected for print quality, dropouts of print dots, ink droplets trajectory directionality problem and the like.

As a result, for all the ink compositions, the print quality on the recording paper was good.

For the ink compositions A1 to A9, print disorders, such as dropouts of print dots and ink droplets trajectory directionality problem, did not occur even in continuous printing of 300 pages.

On the other hand, for the ink compositions A10 and A11 as comparative ink compositions, the print quality was the same as that for the ink compositions A1 to A9. In the case of continuous printing, although printing of about 100 pages caused no problem, increasing the number of print pages gradually led to the occurrence of an ink droplets trajectory directionality problem and this made it impossible to stably carry out printing of 300 pages. For the ink jet recording apparatus in which the ink droplets trajectory directionality problem occurred, ejection nozzles were observed under a microscope. As a result, the deposition of ink was found around the nozzles. This suggests that the deposition of ink caused the ink droplets trajectory directionality problem Test B Ink compositions B1 to B8 were prepared as follows.

Ink Composition B1

C.I. Pigment Yellow 74 (100 g) as a yellow pigment, 150 g of Joncryl J-62 (manufactured by Johnson Polymer Corp.) as a water-soluble resin dispersant, 6 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a yellow pigment dispersion B1 was prepared.

The yellow pigment dispersion B1 (30 g), 15 g of glycerin, 10 g of 1,2-pentanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition B1 was prepared.

Ink Composition B2

C.I. Pigment Blue 15:3 (100 g) as a cyan pigment, 100 g of Joncryl J-62 (manufactured by Johnson Polymer Corp.) as a water-soluble resin dispersant, 4.5 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a cyan pigment dispersion B2 was prepared.

The cyan pigment dispersion B2 (30 g), 10 g of glycerin, 5 g of diethylene glycol, 1 g of 1,2-hexanediol, and 1 g of Olfine STG were mixed together. Ultrapure water was added to the mixture to bring the total amount of the mixture to 100 g. Thus, a mixed solution was prepared. The mixed solution was then adjusted to pH 9.5 by the addition of triethanolamine an a pH adjustor. This mixed solution was stirred for 2 hr, and was then filtered through a membrane filter with a pore diameter of about 1.2 μm (manufactured by Nihon Millipore, Ltd.). Thus, an ink composition B2 was prepared.

Ink Composition B3

C.I. Pigment Blue 15:3 (100 g) as a cyan pigment, 100 g of Joncryl J-62 (manufactured by Johnson polymer Corp.) as a water-soluble resin dispersant, 4.5 g of potassium hydroxide, and 250 g of water were mixed together. The mixture was disported in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus a cyan pigment dispersion B3 was prepared.

The cyan pigment dispersion B3 (30 g), 10 g of glycerin, 5 g of diethylene glycol, 6 g of 1,2-hexanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. This mixed solution was stirred for 2 hr, and was then filtered through a membrane filter with a pore diameter of about 1.2 μm (manufactured by Nihon Millipore, Ltd.). Thus, an ink composition B3 was prepared.

Ink Composition B4

A yellow Pigment dispersion B4 was prepared in the same manner as used in the preparation of the ink composition B1, except that C.I. Pigment Yellow 128 was used as the pigment instead of C.I. Pigment Yellow 74.

The yellow pigment dispersion B4 (30 g), 15 g of glycerin, 3 g of 1,2-hexanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a puce diameter of about 1.2 μm (manufactured by Nihon Millipore, Ltd.). Thus, an ink composition B4 was prepared.

Ink Composition B5

A magenta pigment dispersion B5 was prepared in the same manner as used in the preparation of the ink composition B1, except that C.I. Pigment Red 122 was used as the pigment instead of C.I. Pigment Yellow 74.

The magenta pigment dispersion B5 (30 g), 15 g of glycerin, 0.5 g of 1,2-heptanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition B5 was prepared.

Ink Composition B6

A yellow pigment dispersion B6 was prepared in the same manner as used in the preparation of the ink composition B4.

The yellow pigment dispersion B6 (30 g), 15 g of glycerin, 3 g of 1,2-hexanediol, 0.5 g of Olfine E 1010, and 0.0 g of Olfine STG were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore Ltd.) Thus, an ink composition B6 was prepared.

Ink Composition B7 (Comparative Example)

A yellow pigment dispersion B7 was prepared in the same manner as used in the preparation of the ink composition B1.

The yellow pigment dispersion B7 (30 g), 15 g of glycerin, 5 g of triethylene glycol monobutyl ether, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition B7 was prepared.

Ink Composition B8 (Comparative Example)

A yellow pigment dispersion B8 was prepared in the same manner as used in the preparation of the ink composition B4.

The yellow pigment dispersion B8 (30 g), 15 g of glycerin, 5 g of triethylene glycol monobutyl ether, and 1 g of Olfine E 1010 were mixed together. Ultrapure water was added to the mixture to being the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition B8 was prepared.

Evaluation Test B

Evaluation Test B1: Ejection Stability

For each of the ink compositions B1 to B8, a pattern having a combination of graphics and texts continuously printed by means of a piezoelectric on-demand ink jet printer MJ-930C manufactured by Seiko Epson Corporation. In this case, the number of prints produced, until an ink droplets trajectory directionality problem occurred, was counted. The results were evaluated according to the following criteria.

A plain paper Xerox-P manufactured by Fuji Xerox Co., Ltd. was used an a printing paper in the test.

AA: An average number of prints produced in continuous printing of not less than 300

A: An average number of prints produced in continuous printing of not less than 100 and less than 300

B: An average number of prints produced in continuous printing of not less than 50 and less than 100

C: An average number of prints produced in continuous printing of less than 50

Evaluation Test B2: Recovery from Clogging

Each of the ink compositions B1 to B8 was filled into the head of the printer MJ-930C, and ejection of ink through all nozzles was confirmed. The printer was then allowed to stand without capping in an environment of 25° C. for one year. After the standing, cleaning operation was carried out until all the nozzles could normally eject the ink. The number of cleaning operations necessary for return to normal ejection of ink through all the nozzles was evaluated according to the following criteria.

A: Two or less cleaning operations

B: Three or four cleaning operations

C: Five or more cleaning operations

The results were as summarized in Table 1.

Test C

Preparation of Dispersants

Dispersants α to γ for dispersing pigments were prepared according to the procedure described in Japanese Patent Laid-Open No. 9418/1999. Specifically, these dispersants were prepared as follows.

Dispersant α: t-butylstyrene/styrene//metharylic Acid (27/18//55 wt %) Block Copolymer At the outset, the following ingredients were provided, and a macromonomer a was prepared as follows.

| | Ingredients | Weight, g |
|---|---|---|
| Portion 1: | Methanol | 233.4 |
| | Isopropanol | 120.3 |
| Portion 2: | Methacrylic acid monomer | 238.1 |
| | Methanol | 39.3 |
| Portion 3: | Isopropyl-bis(borondichloromethyl-glyoximate) cobalt(III) salt | 0.143 |
| | 2,2'-Azobis(2,2-dimethylvaloronitrilo) (Vazo (trademark, manufactured by DuPont)) | 6.52 |
| | Acetone | 87.2 |

The mixture of the portion 1 was charged into a 2-liter flask equipped with a thermometer, a stirrer, a dropping funnel, a reflux condenser, and means for maintaining a nitrogen blanket for covering reactants. The mixture was heated to the reflux temperature, and was refluxed for about 20 min. The portions 2 and 3 were simultaneously added to the reaction mixture while maintaining the temperature of the reaction mixture at the reflux temperature. In this case, the portion 2 was added over a period of 4 hr, and the portion 3 was added over a period of 4.5 hr. The reflux was continued for additional 2 hr. and the solution was then cooled to room temperature to prepare a macromonomer solution a.

Next, the macromonomer a and, in addition, the following ingredients were provided, and a dispersant α was prepared according to the following procedure.

| | Ingredients | Weight, g |
|---|---|---|
| Portion 1a: | Macromonomer a | 152.4 |
| | 2-Pyrrolidone | 40.0 |
| Portion 2a: | Lupersol 11 (t-butyl peroxypivalate (manufactured by Elf Arochem North America) | 0.67 |
| | Acetone | 10.0 |
| Portion 3a: | 1-Butylstyrene | 27.0 |
| | Styrene | 18.0 |
| Portion 4a: | Lupersol 11 | 2.67 |
| | Acetone | 20.0 |
| Portion 5a: | Lupersol 11 | 0.67 |
| | Acetone | 10.0 |

The mixture of the portion 1a was charged into a 500-mL flask equipped with a thermometer, a stirrer, a dropping funnel, a reflux condenser, and means for maintaining a nitrogen blanket for covering reactants. The mixture was heated to the reflux temperature, and was refluxed for about 10 min. The solution of the portion 2a was added thereto. Subsequently, the portions 3a and 4a were simultaneously added to the reaction mixture while maintaining the temperature of the reaction mixture at the reflux temperature. In this case, the portions 3a and 4a were added over a period of 3 hr. The reaction mixture was refluxed for one hr. Thereafter, the solution of the portion 5a was added thereto, and the reaction mixture was then refluxed for additional one hr. The mixture was subjected to distillation until about 117 g of volatiles was recovered. 2-Pyrrolidone (75.0 g) was then added thereto to prepare 239.0 g of a 41.8% polymer solution (dispersant α).

Dispersant β: Styrene/methyl methacrylate//methacrylic Acid (25.0/29.2//45.8 wt %) Block Copolymer The following ingredients were provided, and a dispersant β was prepared as follows.

|  | Ingredients | Weight, g |
|---|---|---|
| Portion 1b: | Macromonomer a | 152.4 |
|  | 2-Pyrrolidone | 40.0 |
| Portion 2b: | Lupersol 11 | 0.67 |
|  | Acetone | 10.0 |
| Portion 3b: | Styrene | 30.0 |
|  | Styrene methacrylate | 35.0 |
| Portion 4b: | Lupersol 11 | 2.67 |
|  | Acetone | 20.0 |
| Portion 5b: | Lupersol 11 | 0.67 |
|  | Acetone | 10.0 |

The procedure used in the preparation of the dispersant α was repeated, except that the above portions 1b to 5b were used. Thus, 270 g of a 44.0% polymer solution (dispersant β) was prepared.

Dispersant γ: t-butylstyrene/styrene/methacrylic Acid (27/18//55 wt %) Random Copolymer The following ingredients were provided, and a dispersant γ was prepared as follows.

|  | Ingredients | Weight, g |
|---|---|---|
| Portion 1c: | t-Butylstyrene | 4.0 |
|  | Styrene | 5.2 |
|  | Methacrylic acid | 8.8 |
|  | 2-Pyrrolidone | 40.0 |
|  | Isopropanol | 90.0 |
| Portion 2c: | Lupersol 11 | 0.67 |
|  | Acetone | 10.0 |
| Portion 3c: | t-Butylstyrene | 21.0 |
|  | Styrene | 16.8 |
|  | Methacrylic acid | 46.2 |
| Portion 4c: | Lupersol 11 | 2.67 |
|  | Acetone | 20.0 |
| Portion 5c: | Lupersol 11 | 0.67 |
|  | Acetone | 10.0 |

The procedure used in the preparation of the dispersant α was repeated, except that the above portions 1c to 5c were used. Thus 205 g of a 43% polymer solution (dispersant γ) was prepared.

Preparation of Ink Compositions

The dispersants α to γ thus obtained were used to prepare the following ink compositions C1 to C8.

Ink Composition C1

C.I. Pigment Yellow 74 (100 g) as a yellow pigment, 150 g of the dispersant α, 6 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a yellow pigment dispersion C1 was prepared.

The yellow pigment dispersion C1 (30 g), 15 g of glycerin, 10 g of 1,2-pentanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition C1 was prepared.

Ink Composition C2

C.I. Pigment Blue 15:3 (100 g) as a cyan pigment, 100 g of the dispersant α, 4.5 g of potassium hydroxide, and 250 g of water were mixed together. The mixture was dispersed in a hall mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a cyan pigment dispersion C2 was prepared.

The cyan pigment dispersion C2 (30 g), 10 g of glycerin, 5 g of diethylene glycol, 1 g of 1,2-hexanediol, and 1 g of Olfine STG were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. This mixed solution was stirred for 2 hr, and was then filtered through a membrane filter with a pore diameter of about 1.2 μm (manufactured by Nihon Millipore, Ltd.). Thus, an ink composition C2 was prepared.

Ink Composition C3

C.I. Pigment Blue 15:3 (100 g) as a cyan pigment, 100 g of the dispersant α, 4.5 g of potassium hydroxide and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, α cyan pigment dispersion C3 was prepared.

The cyan pigment dispersion C3 (30 g), 10 g of glycerin, 5 g of diethylene glycol, 6 g of 1,2-hexanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. This mixed solution was stirred for 2 hr, and was then filtered through a membrane filter with a pore diameter of about 1.2 μm (manufactured by Nihon Millipore, Ltd.). Thus, an ink composition C3 was prepared.

Ink Composition C4

C.I. Pigment Yellow 128 (100 q) as a yellow pigment, 150 g of the dispersant β, 6 g of potassium hydroxide, and 250 g of water were mixed together. The mixture was dispersed in a ball mill using zirconia beads for 10 hr. The stock dispersion thus obtained was filtered through a membrane filter with a pore diameter at about 8 μm (manufactured by Nihon Millipore Ltd.) to remove coarse particles. The filtrate was diluted with water to bring the concentration of the pigment to 10% by weight. Thus, a yellow pigment dispersion C4 was prepared.

The yellow pigment dispersion C4 (30 g), 15 g of glycerin, 3 g of 1,2-hexanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1–2

μm (manufactured by Nihon Millipore, Ltd.). Thus, an ink composition C4 was prepared.

Ink Composition C5

C.I. Pigment Red 122 (100 g) as a pigment, 150 g of the dispersant β, 6 g of potassium hydroxide, and 250 g of water were mixed together. The mixture was dispersed in a ball mill using zirconia beads for 10 hr. The stock dispersion thus obtained was filtered through a membrane filter with a pore diameter of about 8 μm (manufactured by Nihon Millipore, Ltd.) to remove coarse particles. The filtrate was diluted with water to bring the concentration of the pigment to 10% by weight. Thus, a magenta pigment dispersion C5 was prepared.

The magenta pigment dispersion C5 (30 g), 15 g of glycerin, 0.5 g of 1,2-heptanediol, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition C5 was prepared.

Ink Composition C6

A yellow pigment dispersion C6 was prepared in the same manner as used in the preparation of the ink composition C4.

The yellow pigment dispersion C6 (30 g), 15 g of glycerin, 3 g of 1,2-hexanediol, 0.5 g of Olfine E 1010, and 0.8 g of Olfine STG were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition C6 was prepared.

Ink Composition C7 (Comparative Example)

A yellow pigment dispersion C7 was prepared in the same manner as used in the preparation of the ink composition C1 except that the dispersant γ was used as the dispersant instead of the dispersant α.

The yellow pigment dispersion C7 (30 g), 15 g of glycerin, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition C7 was prepared.

Ink Composition C8 (Comparative Example)

A yellow pigment dispersion C8 was prepared in the same manner as used in the preparation or the ink composition C4, except that the dispersant γ was used as the dispersant instead of the dispersant α.

The yellow pigment dispersion C8 (30 g), 15 g of glycerin, and 1 g of Olfine E 1010 were mixed together. Ultrapure water was added to the mixture to bring the total amount of the mixture to 100 g. Thus, a mixed solution was prepared. The mixed solution was then adjusted to pH 9.5 by the addition of triethanolamine as a pH adjustor. The mixed solution was stirred for 2 hr, and was then filtered through a membrane filter with a pore diameter of about 1.2 μm (manufactured by Nihon Millipore, Ltd.). Thus, an ink composition C8 was prepared.

Evaluation Test C

Evaluation Test C1: Ejection Stability

For each of the ink compositions C1 to C8, a pattern having a combination of graphics and texts was continuously printed by means of a piezoelectric on-demand ink jet printer MJ-930C manufactured by Seiko Epson Corporation. In this case, the number of prints produced, until an ink droplets trajectory directionality problem occurred, wax counted. The results were evaluated according to the following criteria.

A plain paper Xerox-P manufactured by Fuji Xerox Co., Ltd. was used as a printing paper in the test.

AA: An average number of prints produced in continuous printing of not less than 300

A: An average number of prints produced in continuous printing of not less than 100 and less than 300

B: An average number of prints produced in continuous printing of not less than 50 and less than 100

C: An average number of prints produced in continuous printing of leas than 50

Evaluation Test C2: Recovery from Clogging

Each of the ink compositions C1 to C8 was filled into the head of the printer MJ-930C, and ejection of ink through all nozzles was confirmed. The printer was then allowed to stand without capping in an environment of 25° C. for one year. After the standing, cleaning operation was carried out until all the nozzles could normally eject the ink. The number of cleaning operations necessary for return to normal ejection of ink through all the nozzles was evaluated according to the following criteria.

A: Two or less cleaning operations

B: Three or four cleaning operations

C: Five or more cleaning operations

For each of the ink compositions C1 to C8, a print pattern of 100% duty was printed by means of the same printer as used above. After the printing, the time required for the printed ink no longer to be transferred onto the hand, when the hand is touched to the printed face, was measured. The results were evaluated according to the following criteria.

A plain paper Xerox-P manufactured by Fuji Xerox Co., Ltd. was used as a printing paper in the test A: Less than 30 sec B: Not less than 30 sec and less than 1 min C: Not less than 1 min.

The results were au summarized in Table 2.

TABLE 1

| Ink formulation: wt % | Ink composition | | | | | | | |
|---|---|---|---|---|---|---|---|---|
| | B1 | B2 | B3 | B4 | B5 | B6 | B7 | B8 |
| Pigment dispersion | 30 | 30 | 30 | 30 | 30 | 30 | 30 | 30 |
| Pigment | PY 74 | PB 15:3 | PB 15:3 | PY 128 | PR 122 | PY 128 | PY 74 | PY 128 |
| Dispersant | J-62 | J-62 | J-62 | J-62 | J-62 | J-62 | J-62 | J-62 |

TABLE 1-continued

|  | Ink composition | | | | | | | |
|---|---|---|---|---|---|---|---|---|
| Ink formulation: wt % | B1 | B2 | B3 | B4 | B5 | B6 | B7 | B8 |
| Glycerin | 15 | 10 | 10 | 15 | 15 | 15 | 15 | 15 |
| Diethylene glycol | — | 5 | 5 | — | — | — | — | — |
| TEGmBE | — | — | — | — | — | — | 5 | 5 |
| 1,2-Pentanediol | 10 | — | — | — | — | — | — | — |
| 1,2-Hexanediol | — | 1 | 6 | 3 | — | 3 | — | — |
| 1,2-Heptanediol | — | — | — | — | 0.5 | — | — | — |
| Olfine E 1010 | 1 | — | 1 | 1 | 1 | 0.5 | 1 | 1 |
| Olfine STG | — | 1 | — | — | — | 0.8 | — | — |
| Water | Balance | Balance | Balance | Balance | Balance | Balance | Balance | Balance |
| Results of evaluation test B: | | | | | | | | |
| Evaluation test B1 | A | A | A | A | A | A | B | C |
| Evaluation test B2 | A | A | A | A | A | A | A | C |

TABLE 2

|  | Ink composition | | | | | | | |
|---|---|---|---|---|---|---|---|---|
| Ink formulation: wt % | C1 | C2 | C3 | C4 | C5 | C6 | C7 | C8 |
| Pigment dispersion | 30 | 30 | 30 | 30 | 30 | 30 | 30 | 30 |
| Pigment | PY 74 | PB 15:3 | PB 15:3 | PY 128 | PR 122 | PY 128 | PY 74 | PY 128 |
| Resin dispersant* | α | α | α | β | β | β | γ | γ |
| Glycerin | 15 | 10 | 10 | 15 | 15 | 15 | 15 | 15 |
| Diethylene glycol | — | 5 | 5 | — | — | — | — | — |
| TEGmBE | — | — | — | — | — | — | 5 | 5 |
| 1,2-Pentanediol | 10 | — | — | — | — | — | — | — |
| 1,2-Hexanediol | — | 1 | 6 | 3 | — | 3 | — | — |
| 1,2-Heptanediol | — | — | — | — | 0.5 | — | — | — |
| Olfine E 1010 | 1 | — | 1 | 1 | 1 | 0.5 | 1 | 1 |
| Olfine STG | — | 1 | — | — | — | 0.8 | — | — |
| Water | Balance | Balance | Balance | Balance | Balance | Balance | Balance | Balance |
| Results of evaluation test C: | | | | | | | | |
| Evaluation test C1 | A | A | A | A | A | A | A | A |
| Evaluation test C2 | A | A | A | A | A | A | A | A |
| Evaluation test C3 | A | A | A | A | A | A | B | B |

*Resin dispersant
α: t-butylstyrene/styrene/methacrylic acid (27/18/15) block copolymer
β: styrene/methyl methacrylate/methacrylic acid (25/29.2/45.8) block copolymer
γ: t-butylstyrene/styrene/methacrylic acid random copolymer

The invention claimed is:

1. An ink composition comprising a colorant, a humectant, a glycol monoether, a 1,2-alkanediol, and water, wherein the weight ratio of the glycol monoether to the 1,2-alkanediol is in the range of 1:5 to 5:1.

2. The ink composition according to claim 1, wherein the weight ratio of the glycol monoether to the 1,2-alkanediol is in the range of 1:2 to 2:1.

3. The ink composition according to claim 1, wherein the glycol monoether is glycol monobutyl ether.

4. The ink composition according to claim 1, wherein the 1,2-alkanediol has 6 to 8 carbon atoms.

5. The ink composition according to claim 1, wherein the glycol monoether is glycol monobutyl ether, the 1,2-alkanediol is 1,2-hexanediol, and the content of the 1,2-hexanediol is less than 2.5% by weight based on the total amount of the ink composition.

6. The ink composition according to claim 1, wherein the colorant is a water-soluble dye.

7. The ink composition according to claim 1, which further comprises a nonionic surfactant.

8. The ink composition according to claim 7, wherein the nonionic surfactant is an acetylene glycol surfactant.

9. An ink jet recording method comprising the steps of: ejecting droplets of an ink composition; and depositing the droplets onto a recording medium to perform printing, wherein the ink composition is one according to claim 1.

10. A record produced by the recording method according to claim 1.

11. The ink composition according to claim 1, wherein the colorant is a pigment.

12. The ink composition according to claim 11, which further comprises a dispersant for dispersing the pigment.

* * * * *